(12) United States Patent
Micanek et al.

(10) Patent No.: US 9,163,556 B2
(45) Date of Patent: Oct. 20, 2015

(54) TURBINE WASTEGATE

(71) Applicant: Honeywell International Inc., Morristown, NJ (US)

(72) Inventors: Vit Micanek, Brno (CZ); Lukas Rusek, Brno (CZ); Stanislav Hahn, Znojmo (CZ); Aurobbindo Lingegowda, Bangalore (IN); Raghavendra Gattu, Bangalore (IN); Mahidhar Ratnaakaram Raju, Madanapalle (IN); Krishnamurthy Vaidyanathan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 80 days.

(21) Appl. No.: 14/071,767

(22) Filed: Nov. 5, 2013

(65) Prior Publication Data

US 2015/0121863 A1    May 7, 2015

(51) Int. Cl.
*F02D 23/00* (2006.01)
*F16K 31/165* (2006.01)
*F02B 37/18* (2006.01)

(52) U.S. Cl.
CPC .................. *F02B 37/183* (2013.01)

(58) Field of Classification Search
CPC ............................. F02B 37/183; F16K 27/12
USPC ............................................ 60/602; 137/559
See application file for complete search history.

(56) References Cited

U.S. PATENT DOCUMENTS

| 3,089,304 | A | * | 5/1963 | Bozzola | 60/602 |
| 4,171,936 | A | * | 10/1979 | Hageman et al. | 60/602 |
| 4,254,625 | A | * | 3/1981 | Bergstedt et al. | 60/602 |
| 4,311,008 | A | | 1/1982 | Yamada | |
| 4,658,587 | A | * | 4/1987 | Ecomard | 60/602 |
| 6,976,359 | B2 | | 12/2005 | Hastings | |
| 2011/0173974 | A1 | | 7/2011 | Grabowska | |
| 2013/0263589 | A1 | * | 10/2013 | Yamada et al. | 60/602 |

FOREIGN PATENT DOCUMENTS

| DE | 19 89 619 U | 7/1968 |
| DE | 10 2007 018618 A1 | 10/2007 |
| DE | 10 2010 036778 A1 | 5/2011 |
| EP | 2146071 A2 | 1/2010 |
| WO | 2006046810 A1 | 5/2006 |
| WO | 2009106161 A1 | 9/2009 |
| WO | 2012069138 A1 | 5/2012 |

OTHER PUBLICATIONS

Extended European Search Report, Apr. 10, 2015, European Patent Application No. EP 14 187 199.6 (6 pages).
Drawing, Honeywell International (Garrett), 1977.

* cited by examiner

*Primary Examiner* — Thai Ba Trieu
*Assistant Examiner* — Ngoc T Nguyen
(74) *Attorney, Agent, or Firm* — Brian J. Pangrle

(57) ABSTRACT

An assembly for a turbocharger can include a turbine housing that defines an exhaust inflow chamber that includes a wastegate valve seat and that defines an exhaust outflow chamber; and a wastegate valve plug that includes a seal surface where, in a closed state, the seal surface seats against the wastegate valve seat and where, in an open state, the wastegate valve plug extends into the exhaust inflow chamber. Various other examples of devices, assemblies, systems, methods, etc., are also disclosed.

20 Claims, 11 Drawing Sheets

TURBINE WASTEGATE

TECHNICAL FIELD

Subject matter disclosed herein relates generally to turbomachinery for internal combustion engines and, in particular, to turbine wastegates.

BACKGROUND

A turbine wastegate is typically a valve (e.g., a wastegate valve) that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. A wastegate valve plug of an internal wastegate often includes a flat disk shaped surface that seats against a flat seat (e.g., a valve seat or wastegate seat) disposed on a low pressure side of an exhaust bypass opening. In a closed position, such a wastegate valve plug should be seated against the seat (e.g., seating surface) with sufficient force to effectively seal the exhaust bypass opening to prevent leakage of exhaust from a high pressure exhaust supply on one side of the opening to a lower pressure region on the other side of the opening.

Various examples of wastegates and wastegate components are described herein that can optionally provide for improved kinematics, reduced exhaust leakage, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
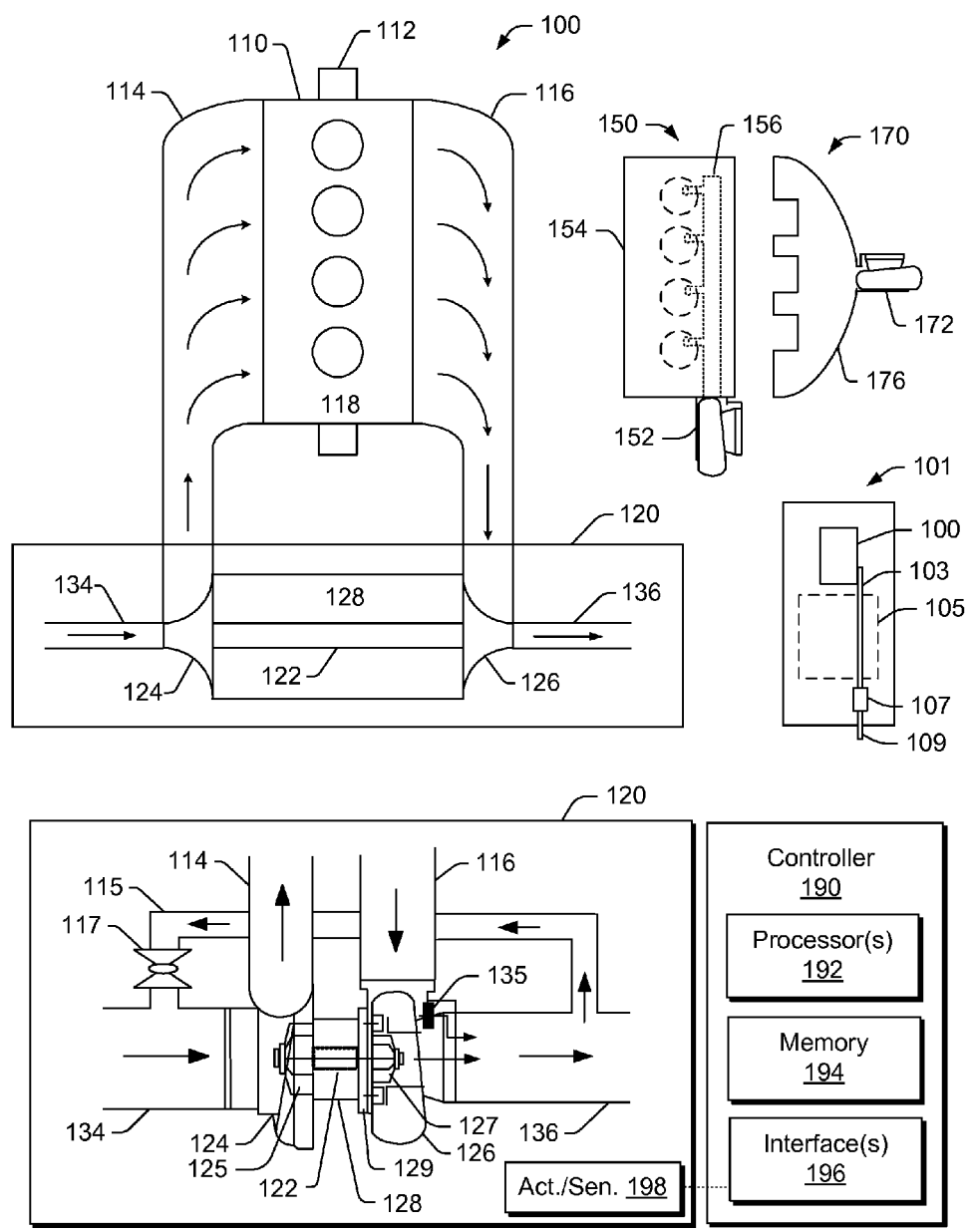
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
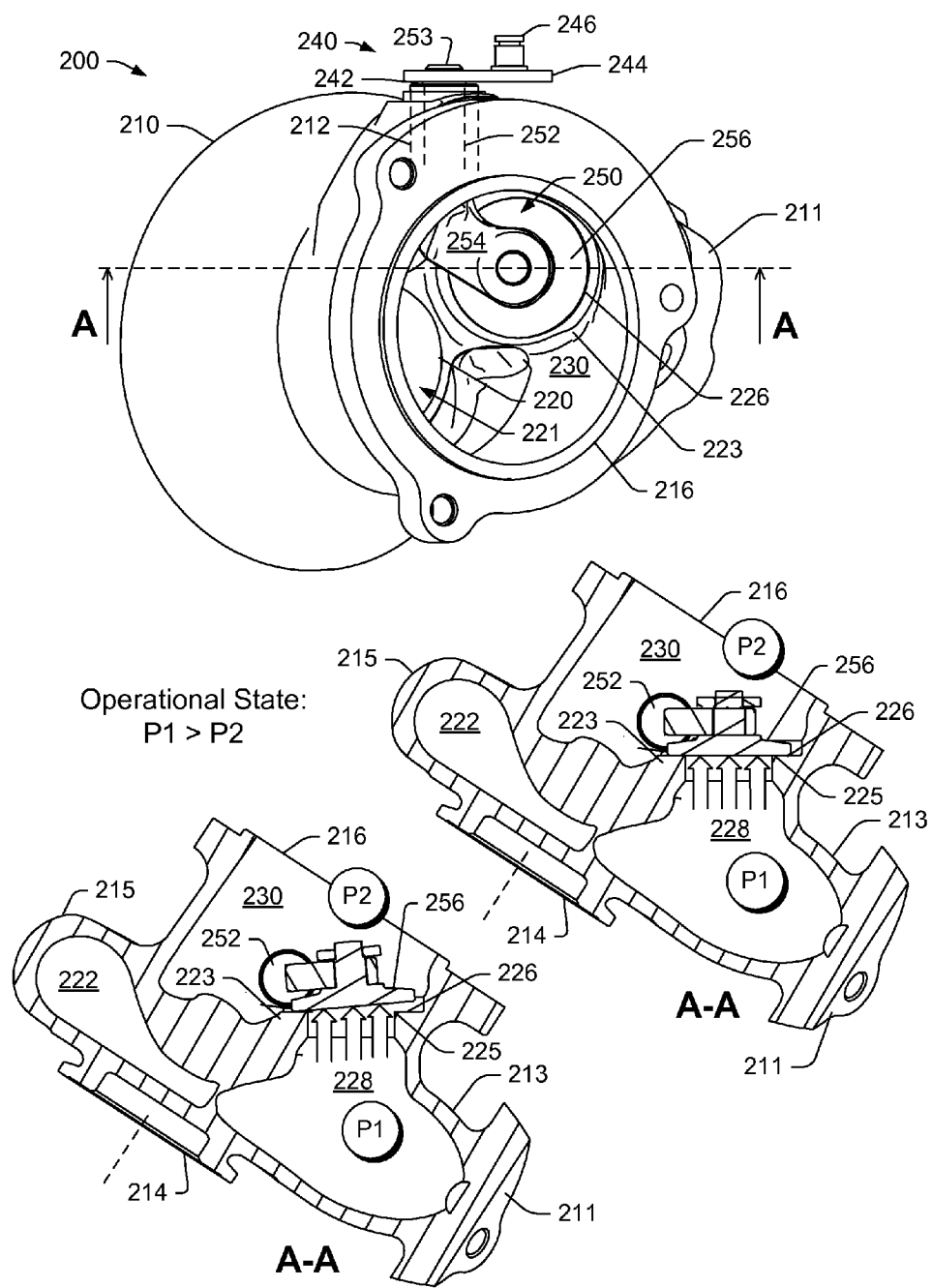
FIG. 2 is a series of view of an example of an assembly that includes a wastegate with a wastegate valve seat disposed in an exhaust outlet chamber (e.g., a low pressure side of an exhaust bypass opening)

FIG. 2 shows a perspective view of an example of an assembly 200 and cutaway views of the assembly 200 along a line A-A. As shown, the assembly 200 includes a turbine housing 210 that includes a flange 211, a bore 212, an inlet conduit 213, a turbine wheel opening 214, a spiral wall 215, an exhaust outlet opening 216, a shroud wall 220, a nozzle 221, a volute 222 formed in part by the spiral wall 215 and in fluid communication with the nozzle 221, a wastegate wall 223 that extends to an exhaust bypass opening 225 and to a wastegate seat 226, an exhaust inflow chamber 228, and an exhaust outflow chamber 230.

As an example, the wastegate wall 223 may form the exhaust bypass opening 225 (e.g., a wastegate opening). As an example, the wastegate wall 223 may form the wastegate seat 226. As an example, an assembly may include a seat component, for example, a seat component coupled to the wastegate wall 223 where a seat surface of the seat component faces the exhaust outflow chamber 230.

In the example of FIG. 2, the turbine housing 210 may be a single piece or multi-piece housing. As an example, the turbine housing 210 may be a cast component (e.g., formed via sand casting or other casting process). The turbine housing 210 includes various walls or wall portions, which can define features such as the bore 212, the turbine wheel opening 214, the exhaust outlet opening 216, the exhaust inflow chamber 228, the exhaust outflow chamber 230, etc. In particular, the wastegate wall 223 defines a wastegate passage in fluid communication with the inlet conduit 213 via the exhaust inflow chamber 228 where a wastegate control linkage 240 and a wastegate arm and plug 250 are configured for opening and closing the wastegate passage for wastegating exhaust from the exhaust inflow chamber 228 to the exhaust outflow chamber 230.

In the example of FIG. 2, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths.

As shown in the example of FIG. 2, in a closed state, the plug 256 is disposed in the exhaust outflow chamber 230 and includes a surface that is intended to seat against the wastegate seat 226 to seal the exhaust bypass opening 225 to prevent flow from the exhaust inflow chamber 228 to the exhaust outflow chamber 230 via the exhaust bypass opening 225.

As an example, the assembly 200 may be fitted to an exhaust conduit or other component of an internal combustion engine (see, e.g., examples of FIG. 1) via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the exhaust outlet chamber 230 and then out of the turbine housing 210 via the exhaust outlet opening 216.

As to wastegating, upon actuation of the control linkage 240 (e.g., by an actuator coupled to the peg 246), the wastegate arm and plug 250 may be rotated such that at least a portion of the received exhaust can flow via the exhaust inflow chamber 228 (e.g., via the wastegate passage defined by the wastegate wall 223), past the wastegate seat 226 and into the exhaust outflow chamber 230, rather than through the nozzle 221 to the turbine wheel space. The wastegated portion of the exhaust may then exit the turbine housing 210 via the exhaust outlet opening 216 (e.g., and pass to an exhaust system of a vehicle, be recirculated in part, etc.).

In the example of FIG. 2, for an operational state where a pressure P1 in the exhaust inflow chamber 228 is greater than a pressure P2 in the exhaust outflow chamber 230, force may be exerted upon the plug 256 (e.g., due to a pressure differential between P1 and P2). Such force may be transmitted from the plug 256 to the arm 254 to the shaft 252 and so on, for example, to the wastegate control linkage 240 (e.g., and to an actuator, etc.). Such force may interfere with operation of the plug 256 or one or more components operatively coupled to the plug 256. As an example, such force may cause leakage of exhaust past the plug 256. As an example, such force may cause the plug 256 to open prematurely. As an example, such force may cause wear, for example, to the plug 256, to the seat 226, to one or more components operatively coupled to the plug 256, etc. As an example, where pressure varies with respect to time (e.g. due to pressure pulses caused by operation of a multicylinder internal combustion engine), chatter may occur where, for example, the plug 256 repeatedly contacts the seat 226 as force transmitted to the plug 256 via the arm 254 may not be sufficient to accommodate the pressure variations with respect to time. Such chatter may impact one or more components operatively coupled to the plug 256, which may lead to wear, misalignment, etc.

Figure 3:
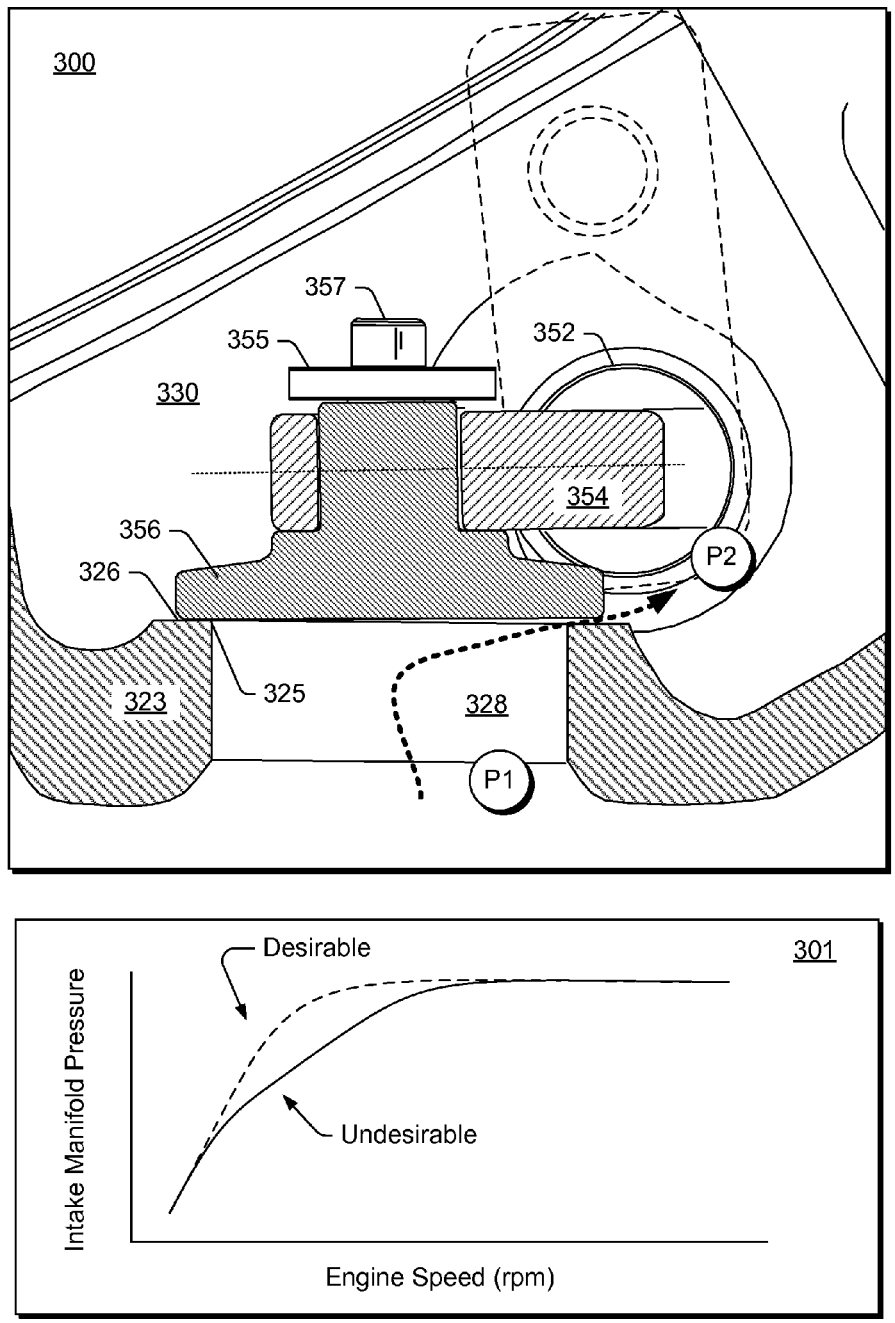
FIG. 3 shows a cutaway view of a portion of an example of an assembly and an example of a plot that demonstrate mechanisms of undesirable exhaust leakage and consequences thereof.

FIG. 3 shows a cross-sectional view through a portion of an assembly 300 with a wastegate. Specifically, FIG. 3 shows a housing 310 and an arm 354 configured to receive a plug 356 attached to the arm 354 via a peg or stem 357 and a washer 355. As mentioned, various issues can arise during operation, which may lead to exhaust leakage from an exhaust inlet chamber 328 to an exhaust outlet chamber 330 via an exhaust bypass opening 325 (e.g., as defined by a wall 323 of the housing 310).

As shown in FIG. 3, a flat surface 326 of the housing 310 surrounds the opening 325 and a flat surface of the plug 356 has a perimeter that exceeds the perimeter of the opening 325. To effectively seal the opening 325, a portion of the flat surface of the plug 356 must seat evenly against the flat surface 326 of the housing 310. In other words, to seal the opening 325, the flat surface of the plug 356 must be parallel to and in contact with the flat surface 326 of the housing 310.

During operation, where a pressure P1 in the exhaust inlet chamber 328 exceeds a pressure P2 in the exhaust outlet chamber 330, force may cause the plug 356 to lift, for example, as indicated by a gap between the flat surface of the plug 356 and the flat surface 326 of the housing 310 (see arrow representing leakage flow of exhaust).

FIG. 3 shows a plot 301 of intake manifold pressure versus engine speed where a desirable control profile provides for a relatively linear increase in intake manifold pressure with respect to engine speed and where an undesirable control profile deviates from the desirable profile. For both profiles, at a particular engine speed, the intake manifold pressure is at a maximum, for example, as may be achieved by opening a wastegate valve (e.g., to reduce turbocharger boost to intake air).

As an example, an intake manifold pressure versus engine speed profile may be shaped by characteristics of a wastegate assembly of a turbocharger. For example, where a wastegate valve opens prematurely, the manifold intake pressure may drop as an amount of exhaust is undesirably wastegated rather than directed to a turbine wheel in a turbine wheel space of a turbine housing of a turbocharger where it could charge intake air via a compressor that would, in turn, increase intake manifold pressure. In terms of performance, while such a wastegate may provide protections against excessive boost (e.g., limiting maximum boost), it may come at a cost, for example, by delaying time to maximum boost, reducing boost over a range of engine speeds, etc.

Over time, premature opening of a wastegate valve may worsen, for example, as clearances between various components (e.g., plug, arm, shaft, shaft bore, bushings, etc.) may change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. Problems may include leakage, lack of controllability or a combination of leakage and uncontrollability.

Figure 4:
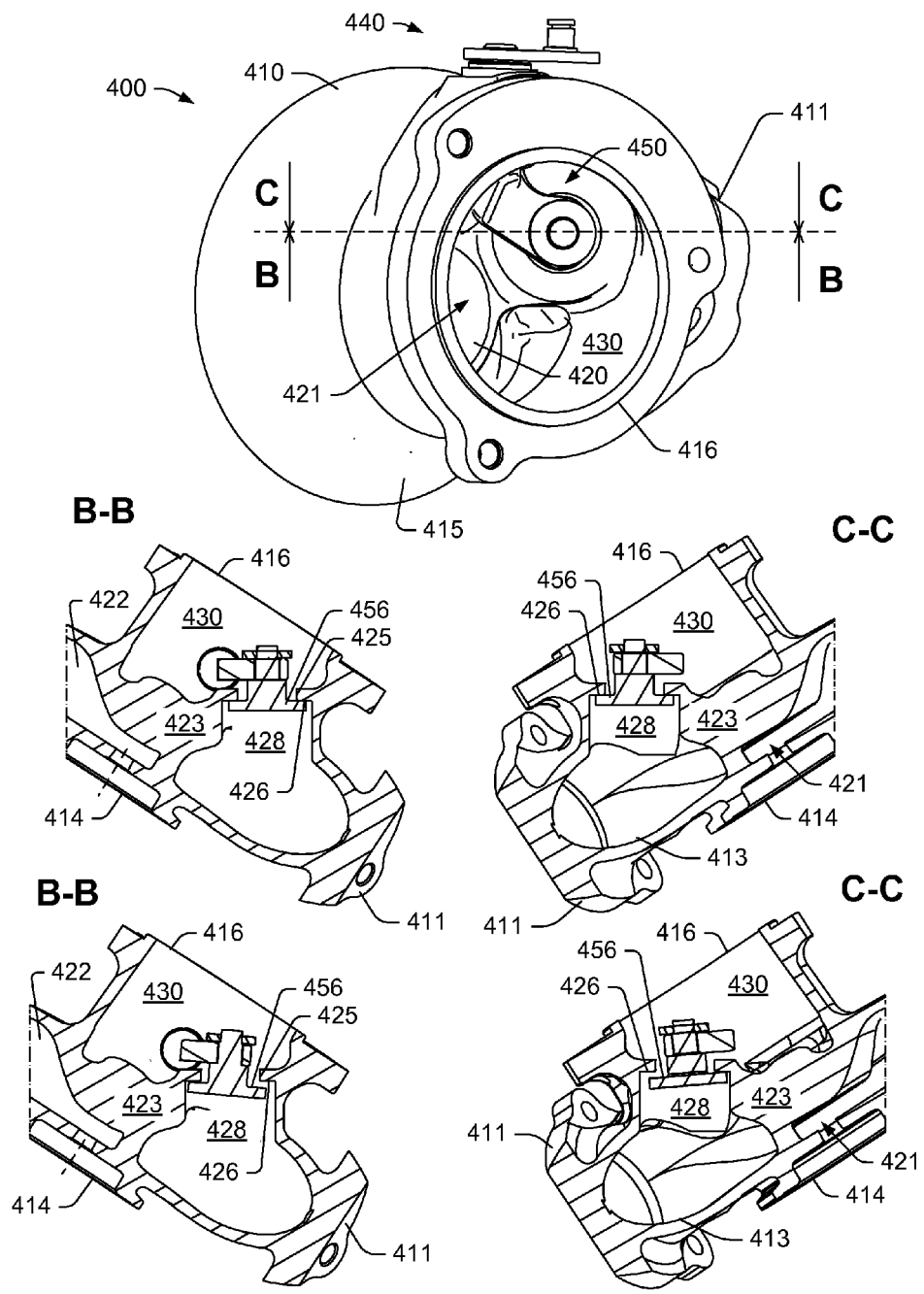
FIG. 4 shows a series of views of an example of an assembly that includes a wastegate valve seat disposed in an exhaust inlet chamber (e.g., a high pressure side of an exhaust bypass opening)

FIG. 4 shows a series of views of an example of an assembly 400 that includes a wastegate valve seat 426 disposed in an exhaust inlet chamber 428 (e.g., a high pressure side of an exhaust bypass opening 425). In particular, FIG. 4 shows a perspective view of the assembly 400 and cutaway views along a line B-B and along a line C-C (e.g., splitting the assembly 400). In FIG. 4, the cutaway views show the assembly in a closed state and in an open state with respect to a wastegate valve plug 456 and the wastegate valve seat 426.

As shown in FIG. 4, the assembly 400 includes a turbine housing 410 that defines the exhaust inflow chamber 428, a wastegate valve seat 426 and an exhaust outflow chamber 430. As an example, the wastegate valve seat 426 may be defined by the turbine housing 410, for example, where the turbine housing 410 includes a valve seat component. As shown, the assembly 400 also includes a wastegate valve plug 456 that includes a seal surface where, in a closed state, the seal surface seats against the wastegate valve seat 426 and where, in an open state, the wastegate valve plug 426 extends into the exhaust inflow chamber 428.

As shown in FIG. 4, the turbine housing 410 includes a flange 411, an inlet conduit 413, a turbine wheel opening 414, a spiral wall 415, an exhaust outlet opening 416, a shroud wall 420, a nozzle 421, a volute 422 formed in part by the spiral wall 415 and in fluid communication with the nozzle 421, a wastegate wall 423 that extends to the exhaust bypass opening 425 and to the wastegate valve seat 426, the exhaust inflow chamber 428, and an exhaust outflow chamber 430.

As an example, the wastegate wall 423 may form the exhaust bypass opening 425 (e.g., a wastegate opening). As an example, the wastegate wall 423 may form the wastegate valve seat 426. As an example, an assembly may include a seat component, for example, a seat component coupled to the wastegate wall 423 where a seat surface of the seat component faces the exhaust outflow chamber 430.

In the example of FIG. 4, the turbine housing 410 may be a single piece or multi-piece housing. As an example, the turbine housing 410 may be a cast component (e.g., formed via sand casting or other casting process). As mentioned, the turbine housing 410 includes various walls or wall portions, which can define features such as a wastegate control shaft bore, the turbine wheel opening 414, the exhaust outlet opening 416, the exhaust inflow chamber 428, the exhaust outflow chamber 430, etc. In particular, the wastegate wall 423 defines a wastegate passage in fluid communication with the inlet conduit 413 via the exhaust inflow chamber 428 where a wastegate control linkage 440 and a wastegate arm and plug 450 are configured for opening and closing the wastegate passage for wastegating exhaust from the exhaust inflow chamber 428 to the exhaust outflow chamber 430.

Figure 5:
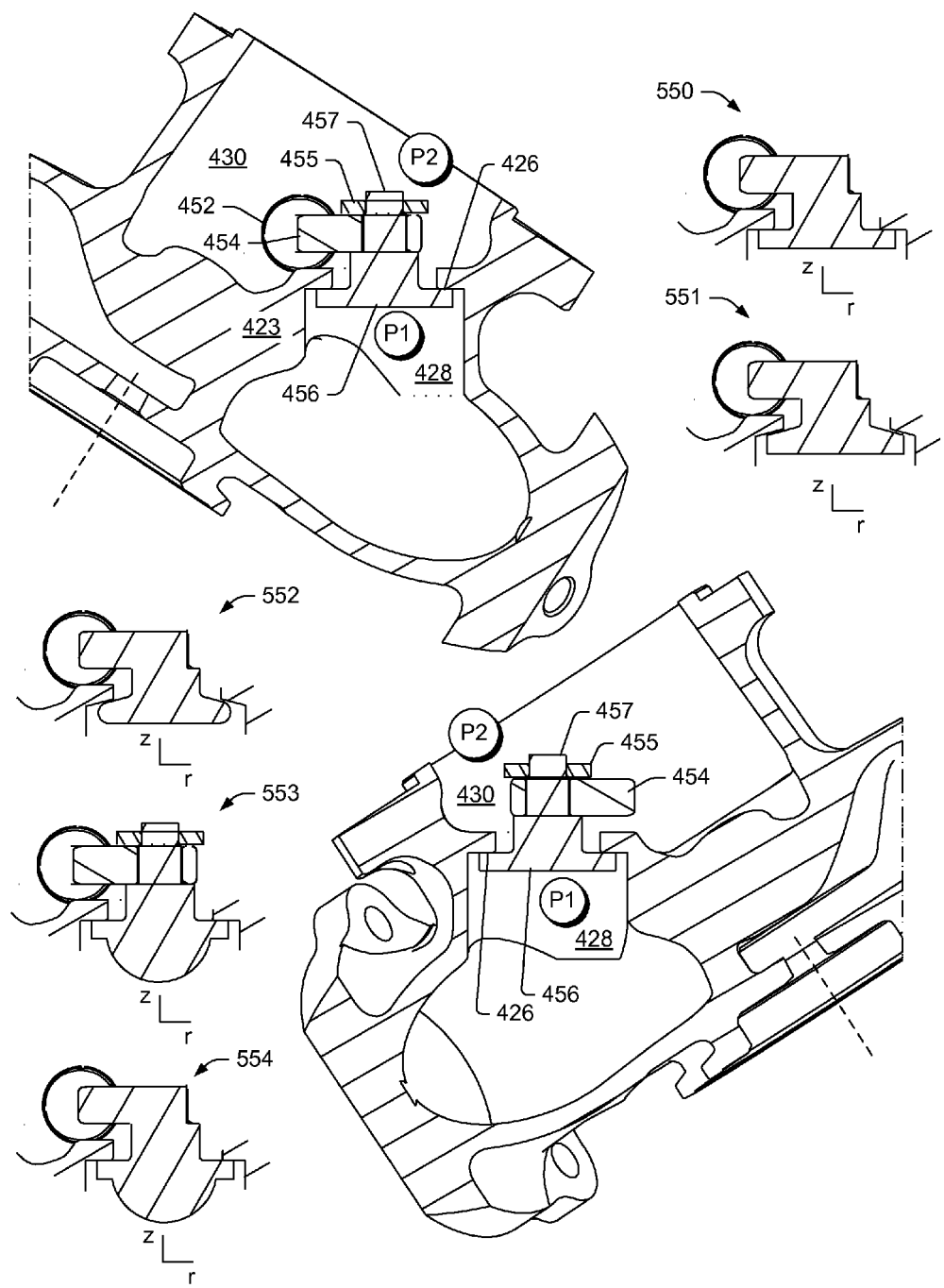
FIG. 5 shows a series of views of the assembly of FIG. 4 and examples of wastegate valve configurations.

FIG. 5 shows two cutaway views of the assembly 400 of FIG. 4 and examples of wastegate valve configurations 550, 551, 552, 553 and 554. As shown, the wastegate valve plug 456 may be coupled to an arm 454, for example, where a stem or peg 457 extends from the wastegate valve plug 456 through an opening of the arm 454. As an example, a washer or coupling member 455 may be provided to couple the wastegate valve plug 456 to the arm 454. As shown, the arm 454 extends to a shaft 452, for example, where the shaft 452 is received by a bore of the turbine housing 410. As an example, one or more bushings or other component may be disposed in or about such a bore, for example, to reduce leakage of exhaust via the bore.

As shown, the wastegate valve plug 456 includes an upper surface (e.g., a seal surface) that seats against the wastegate valve seat 426. During operation, where a pressure in the exhaust inlet chamber 428 exceeds a pressure in the exhaust outlet chamber 430, force is applied to the wastegate valve plug 456 where such force helps to seat the upper surface (e.g., the seal surface) of the wastegate valve plug 456 against the wastegate valve seat 426.

In FIG. 5, the wastegate valve configuration 550 includes a monoblock arm and plug, the wastegate valve configuration 551 includes a sloped upper plug portion that matches a sloped valve seat surface (e.g., conical shaped surface), the wastegate valve configuration 552 includes a toroidal plug portion with a surface that can seal against a sloped valve seat surface, the wastegate valve configuration 553 includes a protruding portion that can protrude into an exhaust inlet chamber to distribute pressure due to flow of exhaust (e.g., upon opening of the valve) and the wastegate valve configuration 554 includes a protruding portion as part of a monoblock arm and plug. As an example, the configurations 551 and 552 may be implemented as a multipiece arm and plug or as a monoblock arm and plug. Each of the configurations 550, 551, 552, 553 and 554 is shown with respect to axes of a cylindrical coordinate system (e.g., r, z and Θ). Various features (e.g., surfaces, joints, shapes, etc.) may be references with respect to such a coordinate system.

As an example, a plug may be shaped as a sphere, a portion of a sphere an ellipsoid, a portion of an ellipsoid, etc. As an example, a valve seat may include a conical shape or a modified conical shape configured to seal against a portion of a sphere, a modified sphere, an ellipsoid, a modified ellipsoid, etc. As an example, an arm may extend to a stem where the stem joins a plug, which may be shaped as a sphere, a portion of a sphere an ellipsoid, a portion of an ellipsoid, etc. As an example, an assembly may be formed by passing an arm portion of a monoblock arm and plug through an opening where the plug portion is configured to seal the opening. As an example, an assembly may be formed by coupling an arm of an arm and plug subassembly to a plug where the plug is positioned for such coupling by inserting the plug into an exhaust inlet opening of a turbine housing.

As an example, a method may include providing a turbocharger that includes a turbine housing that defines an exhaust inflow chamber that includes a wastegate valve seat and that defines an exhaust outflow chamber, and a wastegate valve plug that includes a seal surface where, in a closed state, the seal surface seats against the wastegate valve seat and where, in an open state, the wastegate valve plug extends into the exhaust inflow chamber; and providing exhaust to the exhaust inflow chamber where a pressure of the exhaust in the exhaust inflow chamber applies force to the wastegate valve plug that acts to seat the seal surface against the wastegate valve seat.

As an example, an assembly process may include inserting at least a wastegate valve plug into an exhaust inlet of a turbine housing and then coupling the wastegate valve plug (e.g., or component coupled thereto or integral therewith) to an actuator component, for example, for actuation of the wastegate valve plug (e.g., to provide for a closed state and an open state of a wastegate). In such an example, the exhaust inlet of the turbine housing may be sized to accommodate insertion and maneuvering of the wastegate valve plug, which may be a separate component or a unitary component (e.g., a unitary wastegate valve arm and plug component).

As an example, where pressure is applied to a wastegate valve plug that seats against a wastegate valve seat in an exhaust inlet chamber, the pressure may diminish or eliminate various issues described with respect to the assembly 200 of FIG. 2 and the assembly 300 of FIG. 3. For example, for the assembly 400 of FIGS. 4 and 5, where pressure increases in the exhaust inlet chamber 428 responsive to an increase in engine speed, the increase in pressure may act to seat the wastegate valve plug 456 against the wastegate valve seat 426. As such, premature opening may be avoided and a more desirable profile may be achieved as to intake manifold pressure versus engine speed. Further, chatter may be diminished, which may, in turn, diminish wear, misalignment, etc. of one or more components along a control train (e.g., a train of actuation components).

Figure 6:
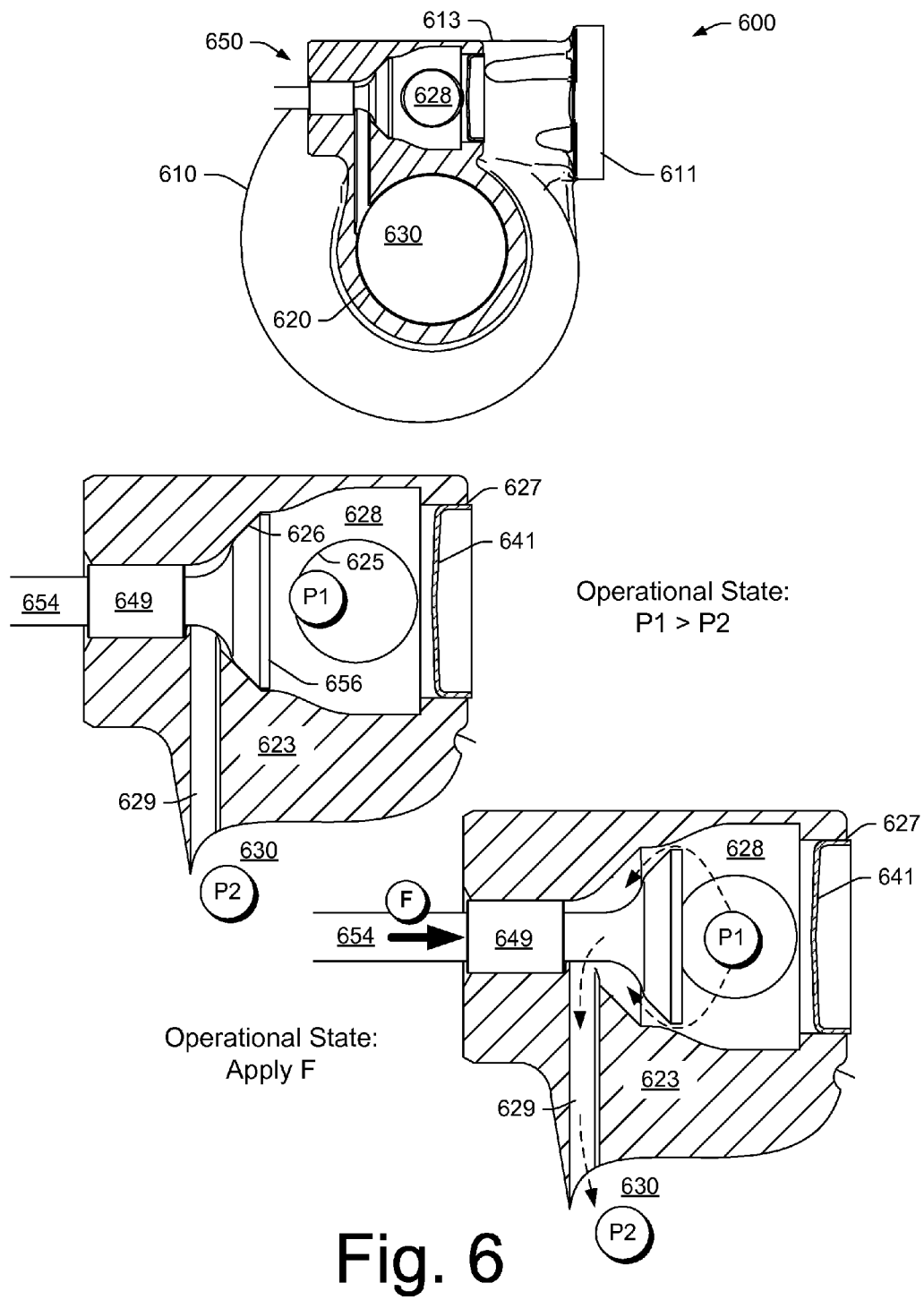
FIG. 6 shows a series of views of an example of an assembly that includes a wastegate valve seat disposed in an exhaust inlet chamber (e.g., a high pressure side of an exhaust bypass opening)

FIG. 6 shows a series of cutaway views of an example of an assembly 600 that includes a wastegate valve seat 626 disposed in an exhaust inlet chamber 628 (e.g., a high pressure side of an exhaust bypass opening).

As shown in FIG. 6, the assembly 600 includes a turbine housing 610 that includes an exhaust inlet 611, a shroud 620 of a turbine wheel space, an exhaust outlet chamber 630 and a wastegate valve sub-assembly 650 that includes a wastegate valve plug 656 and, for example, a stem 654 that may be guided by a bushing 649. In such an example, the stem 654 and the wastegate valve plug 656 may be a unitary component. As an example, the wastegate valve sub-assembly 650 may be a poppet valve sub-assembly.

As shown in FIG. 6, an opening 625 provides for fluid communication between an inlet conduit 613 and the exhaust inlet chamber 628 while the wastegate valve seat 626 defines an exhaust bypass opening between the exhaust inlet chamber 628 and a passage 629, which may be defined by a wall 623 of the turbine housing 610. As shown, the passage 629 couples the exhaust inlet chamber 628 and the exhaust outlet chamber 630 where the position of the wastegate valve plug 656 with respect to the wastegate valve seat 626 determine whether exhaust may flow, for example, from the exhaust inlet chamber 628 via the passage 629 to the exhaust outlet chamber 630.

During operation, as an example, exhaust may flow from the exhaust inlet 611 via a scroll (e.g., a volute) to a nozzle and to a turbine wheel space defined in part by the shroud 620. Where a turbine wheel is present in the turbine wheel space, the exhaust may cause rotation of the turbine wheel as it flow toward an exhaust outlet of the turbine housing 610. Where a pressure P1 for exhaust in the exhaust inlet chamber 628 exceeds a pressure P2 for exhaust in the exhaust outlet chamber 630, the wastegate valve plug 656 may be forced against the wastegate valve seat 626, which may help to reduce undesirable leakage of exhaust (e.g., undesirable wastegating of exhaust). As an example, an approach that leverages a pressure differential to apply force that helps maintain the valve in a close position may increase sealing, increase turbocharger efficiency and reduce valve flutter (e.g., chatter) and wear. Such an approach, as an example, increase precision as to regulation of gas flow through the valve opening, for example, as controlled by actuator stroke. Increased precision of wastegating (e.g., exhaust bypass) may also provide for improved emissions (e.g., regulation of exhaust characteristics to a chemical converter located downstream a turbine assembly), improved longevity of turbocharger components (e.g., more control of compressor characteristics, etc.) and improved matching of demand/engine operation conditions (e.g., responsive to a signal for acceleration, deceleration, EGR, etc.).

In the example of FIG. 6, wastegating may be achieved by translating the wastegate valve plug 656 axially away from the wastegate valve seat 626, which moves the wastegate valve plug 656 into the exhaust inlet chamber 628 and opens the exhaust bypass opening defined by the wastegate valve seat 626. In FIG. 6, a large arrow indicates force (F) being applied to translate the wastegate valve plug 656 axially away from the wastegate valve seat 626 and dashed arrows indicate approximate directions of exhaust flow from the exhaust inlet chamber 628 to the passage 629 and to the exhaust outlet chamber 630 (e.g., due to pressure P1 being greater than pressure P2).

As an example, the shape of a wastegate valve plug and the shape of a wastegate valve seat and optionally a surface adjacent to the wastegate valve seat may be configured to provide desired operational characteristics. For example, a neck region that extends from a wastegate valve seat into an exhaust inlet chamber may be shaped to define a clearance or clearances with respect to a portion of a wastegate valve plug such that as the wastegate valve plug moves (e.g., away or toward the wastegate valve seat) a particular flow profile is achieved. In such an example, a controller may control the position of the wastegate valve plug (e.g., its distance from a wastegate valve seat) to thereby control clearance(s) and hence flow of exhaust from an exhaust inlet chamber to a passage in fluid communication with an exhaust outlet chamber. As an example, flow criteria as a function of stroke length may be tuned for an assembly (e.g., by machining a wastegate valve seat and/or surrounding region, by selection of wastegate valve plug shape, etc.). As an example, flow criteria related to wastegating may be specified in an effort to meet vehicle performance goals, emissions goals, etc.

In the example of FIG. 6, the assembly 600 includes a port 627 and a cap 641 that covers the port 627. As shown, the port 627 opens to the exhaust inlet chamber 628 such that the wastegate valve plug 656 may be inserted therein. After insertion, the cap 641 may be installed to seal the port 627. As an example, the cap 641 may be removable, for example, for removal of the wastegate valve plug 656, which may be, for example, coupled to the stem 654.

Figure 7:
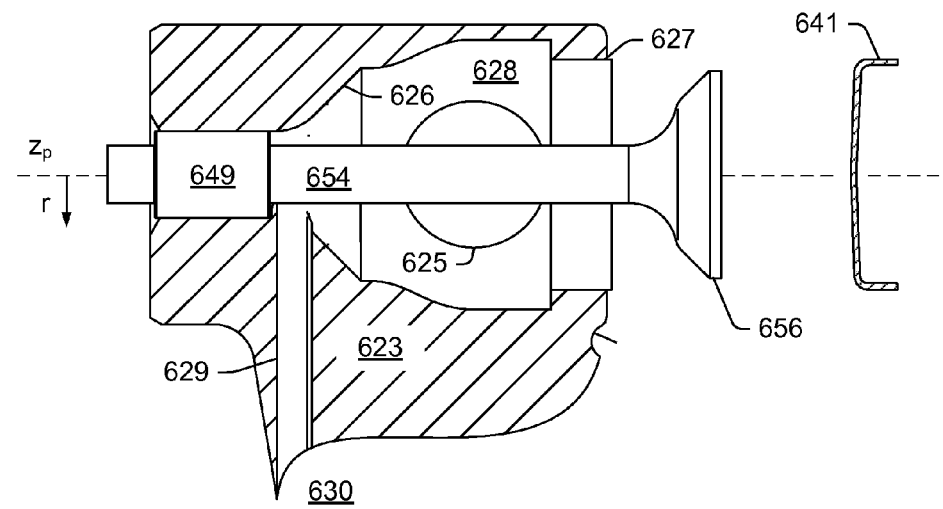
FIG. 7 shows a series of views of a portion of the assembly of FIG. 6 with respect to a method of assembly.
Figure 7:
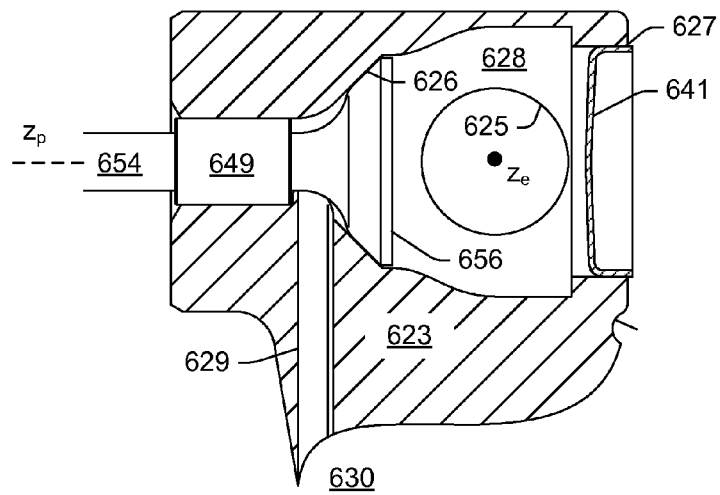

FIG. 7 shows cutaway views of a portion of the assembly 600 in an exploded state and in an assembled state. As mentioned, a method may include inserting a wastegate valve plug into an exhaust inlet chamber via a port and then sealing the port with a cap. For example, as shown, the wastegate valve plug 656 may be inserted into the exhaust inlet chamber 628 via the port 627 followed by sealing of the port 627 by the cap 641. As an example, such a process may be reversed for removal of the wastegate valve plug 656 (e.g., for servicing, etc.).

Figure 8:
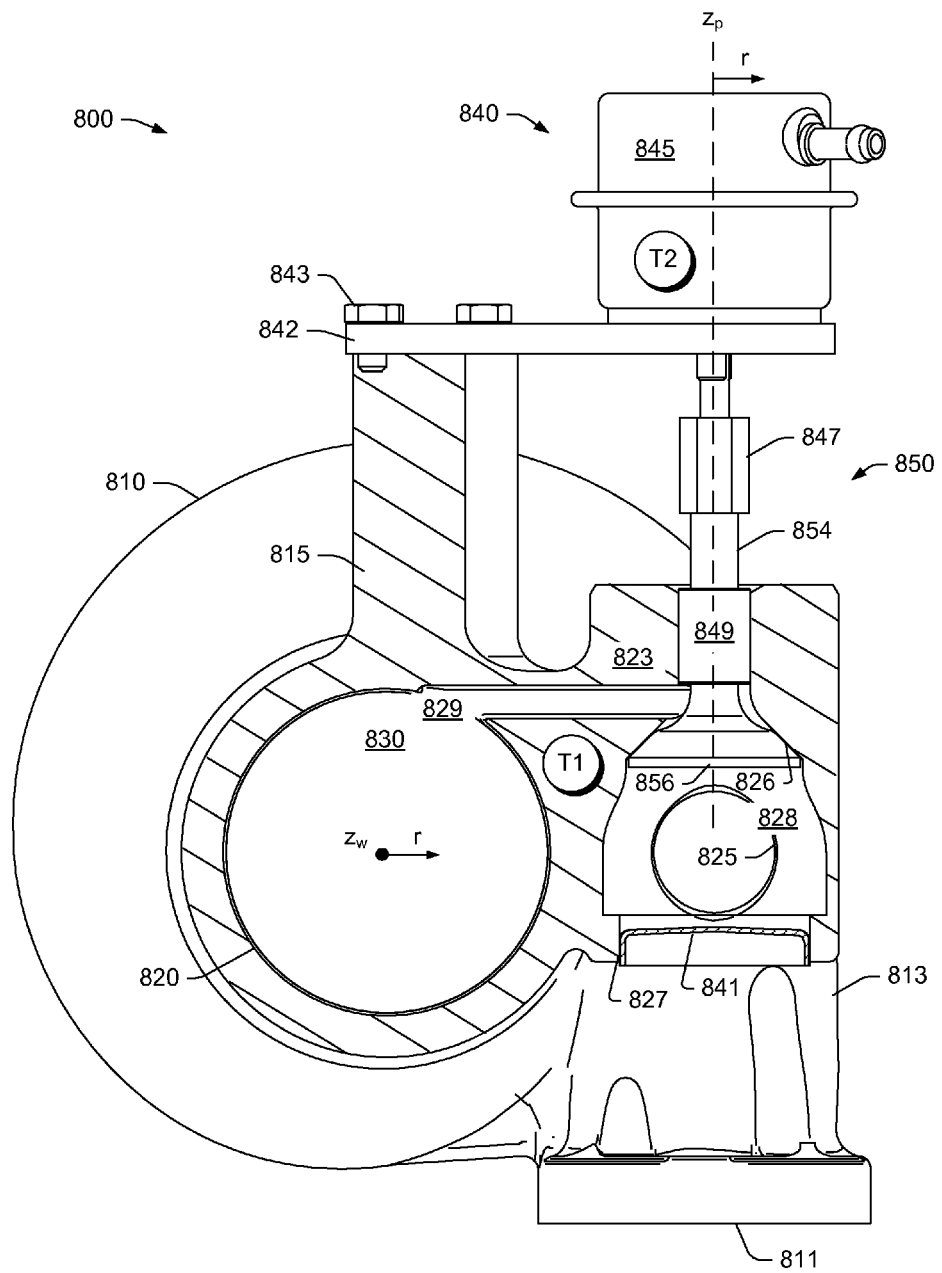
FIG. 8 shows a cutaway view of an example of an assembly that includes a wastegate valve seat disposed in an exhaust inlet chamber (e.g., a high pressure side of an exhaust bypass opening)

FIG. 8 shows a cutaway view of an example of an assembly 800 that includes a wastegate valve seat 826 disposed in an exhaust inlet chamber 828 (e.g., a high pressure side of an exhaust bypass opening).

As shown in FIG. 8, the assembly 800 includes a turbine housing 810 that includes an exhaust inlet 811, a shroud 820 of a turbine wheel space, an exhaust outlet chamber 830 and a wastegate valve sub-assembly 850 that includes a wastegate valve plug 856 and, for example, a stem 854 that may be guided by a bushing 849. In such an example, the stem 854 and the wastegate valve plug 856 may be a unitary component. As an example, the wastegate valve sub-assembly 850 may be a poppet valve sub-assembly.

Also shown in FIG. 8 is an actuator sub-assembly 840 that includes a bracket 842 fixed to an extension 815 of the turbine housing 810, for example, via one or more connectors 843 and that includes a pressure actuated controller 845 that is operatively coupled to the stem 854, for example, via a coupling component 847.

As an example, the coupling component 847 may act to reduce transfer of heat energy from the stem 854 to the controller 845. For example, the coupling component 847 may be formed of a ceramic, a composite material, etc. with thermal conductivity (isotropic or anisotropic) that is less than that of the stem 854. As an example, the coupling component 847 may be formed of a material considered to be an insulator (e.g., a poor conductor of heat energy). As an example, the coupling component 847 may provide a gap such as an air gap between the stem 854 and a plunger or control rod of the controller 845.

As an example, the bracket 842 may act to reduce transfer of heat energy from the extension 815 to the controller 845. For example, the bracket 842 may be configured with sufficient surface area to radiate heat energy and thereby decrease transfer of heat energy to the controller 845. As an example, the bracket 842 may be formed of a ceramic, a composite material, etc. with thermal conductivity (isotropic or anisotropic) that is less than that of the extension 815. As an example, the bracket 842 may be formed of a material considered to be an insulator (e.g., a poor conductor of heat energy). As an example, a gasket may be disposed between the bracket 842 and the extension 815 to reduce transfer of heat energy from the extension 815 to the bracket 842. As an example, one or more features of the assembly 800 may help to ensure that temperature T2 remains less than temperature T1, for example, to enhance operation, longevity, etc. of the controller 845.

As an example, a pressure line may be coupled to the pressure actuated controller 845 to cause the controller to translate the stem 854 and consequently the wastegate valve plug 856. Such action may cause a state transition, for example, to move the wastegate valve plug 856 from a closed state to an open state with respect to the wastegate valve seat 826.

As shown in FIG. 8, an opening 825 provides for fluid communication between an inlet conduit 813 and the exhaust inlet chamber 828 while the wastegate valve seat 826 defines an exhaust bypass opening between the exhaust inlet chamber 828 and a passage 829, which may be defined by a wall 823 of the turbine housing 810. As shown, the passage 829 couples the exhaust inlet chamber 828 and the exhaust outlet chamber 830 where the position of the wastegate valve plug 856 with respect to the wastegate valve seat 826 determine whether exhaust may flow, for example, from the exhaust inlet chamber 828 via the passage 829 to the exhaust outlet chamber 830.

During operation, as an example, exhaust may flow from the exhaust inlet 811 via a scroll (e.g., a volute) to a nozzle and to a turbine wheel space defined in part by the shroud 820. Where a turbine wheel is present in the turbine wheel space, the exhaust may cause rotation of the turbine wheel as it flow toward an exhaust outlet of the turbine housing 810. Where a pressure P1 for exhaust in the exhaust inlet chamber 828 exceeds a pressure P2 for exhaust in the exhaust outlet chamber 830, the wastegate valve plug 856 may be forced against the wastegate valve seat 826, which may help to reduce undesirable leakage of exhaust (e.g., undesirable wastegating of exhaust).

In the example of FIG. 8, wastegating may be achieved by translating the wastegate valve plug 856 axially away from the wastegate valve seat 826, which moves the wastegate valve plug 856 into the exhaust inlet chamber 828 and opens the exhaust bypass opening defined by the wastegate valve seat 826 such that exhaust may flow from the exhaust inlet chamber 828 to the passage 829 and to the exhaust outlet chamber 830.

In the example of FIG. 8, the assembly 800 includes a port 827 and a cap 841 that covers the port 827. As shown, the port 827 opens to the exhaust inlet chamber 828 such that the wastegate valve plug 856 may be inserted therein. After insertion, the cap 841 may be installed to seal the port 827. As an example, the cap 841 may be removable, for example, for removal of the wastegate valve plug 856, which may be, for example, coupled to the stem 854.

In the example of FIG. 8, the assembly 800 provides for mounting control components onto the turbine housing 810, for example, rather than to a compressor housing. Such an approach may facilitate assembly, calibration, etc. when compared to an approach that mounts one or more control components to a compressor housing. For example, where a wastegate controller is mounted to a compressor housing, calibration of a control linkage may involve angular alignment of the compressor housing with respect to a center housing and with respect to a turbine housing. In contrast, where a wastegate controller is mounted to a turbine housing, such alignment concerns may be avoided.

Figure 9:
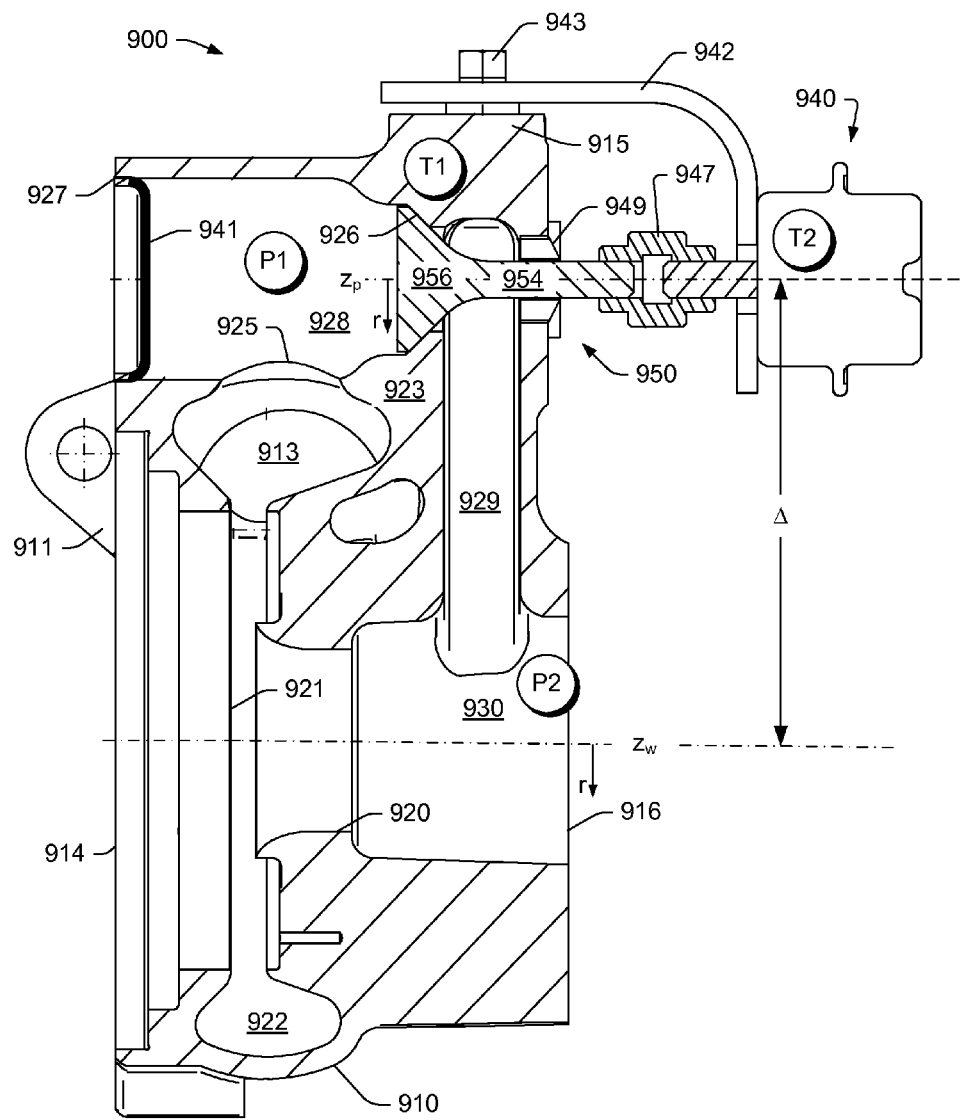
FIG. 9 shows a cutaway view of an example of an assembly that includes a wastegate valve seat disposed in an exhaust inlet chamber (e.g., a high pressure side of an exhaust bypass opening)

FIG. 9 shows a cutaway view of an example of an assembly 900 that includes a wastegate valve seat 926 disposed in an exhaust inlet chamber 928 (e.g., a high pressure side of an exhaust bypass opening).

As shown in FIG. 9, the assembly 900 includes a turbine housing 910 that includes an exhaust inlet 911, a turbine wheel opening 914, an exhaust outlet 916, a shroud 920 of a turbine wheel space, a nozzle 921, a volute 922, an exhaust outlet chamber 930 and a wastegate valve sub-assembly 950 that includes a wastegate valve plug 956 and, for example, a stem 954 that may be guided by a bushing 949. In such an example, the stem 954 and the wastegate valve plug 956 may be a unitary component. As an example, the wastegate valve sub-assembly 950 may be a poppet valve sub-assembly.

Also shown in FIG. 9 is an actuator sub-assembly 940 that includes a bracket 942 fixed to an extension 915 of the turbine housing 910, for example, via one or more connectors 943 and that includes a controller 945 that is operatively coupled to the stem 954, for example, via a coupling component 947.

As an example, the coupling component 947 may act to reduce transfer of heat energy from the stem 954 to the controller 940. For example, the coupling component 947 may be formed of a ceramic, a composite material, etc. with thermal conductivity (isotropic or anisotropic) that is less than that of the stem 954. As an example, the coupling component 947 may be formed of a material considered to be an insulator (e.g., a poor conductor of heat energy). As an example, the coupling component 947 may provide a gap such as an air gap between the stem 954 and a plunger or control rod of the controller 940.

As an example, the bracket 942 may act to reduce transfer of heat energy from the extension 915 to the controller 940. For example, the bracket 942 may be configured with sufficient surface area to radiate heat energy and thereby decrease transfer of heat energy to the controller 940. As an example, the bracket 842 may be formed of a ceramic, a composite material, etc. with thermal conductivity (isotropic or anisotropic) that is less than that of the extension 915. As an example, the bracket 942 may be formed of a material considered to be an insulator (e.g., a poor conductor of heat energy). As an example, a gasket may be disposed between the bracket 942 and the extension 915 to reduce transfer of heat energy from the extension 915 to the bracket 942. As an example, one or more features of the assembly 900 may help to ensure that temperature T2 remains less than temperature T1, for example, to enhance operation, longevity, etc. of the controller 940.

As an example, a line may be coupled to the controller 945 to cause the controller to translate the stem 954 and consequently the wastegate valve plug 956. Such action may cause a state transition, for example, to move the wastegate valve plug 956 from a closed state to an open state with respect to the wastegate valve seat 926.

As shown in FIG. 9, an opening 925 provides for fluid communication between an inlet conduit 913 and the exhaust inlet chamber 928 while the wastegate valve seat 926 defines an exhaust bypass opening between the exhaust inlet chamber 928 and a passage 929, which may be defined by a wall 923 of the turbine housing 910. As shown, the passage 929 couples the exhaust inlet chamber 928 and the exhaust outlet chamber 930 where the position of the wastegate valve plug 956 with respect to the wastegate valve seat 926 determine whether exhaust may flow, for example, from the exhaust inlet chamber 928 via the passage 929 to the exhaust outlet chamber 930.

During operation, as an example, exhaust may flow from the exhaust inlet 911 via the volute 922 (e.g., a scroll) to the nozzle 921 and to a turbine wheel space defined in part by the shroud 920. Where a turbine wheel is present in the turbine wheel space, the exhaust may cause rotation of the turbine wheel as it flow toward an exhaust outlet of the turbine housing 910. Where a pressure P1 for exhaust in the exhaust inlet chamber 928 exceeds a pressure P2 for exhaust in the exhaust outlet chamber 930, the wastegate valve plug 956 may be forced against the wastegate valve seat 926, which may help to reduce undesirable leakage of exhaust (e.g., undesirable wastegating of exhaust).

In the example of FIG. 9, wastegating may be achieved by translating the wastegate valve plug 956 axially away from the wastegate valve seat 926, which moves the wastegate valve plug 956 into the exhaust inlet chamber 928 and opens the exhaust bypass opening defined by the wastegate valve seat 926 such that exhaust may flow from the exhaust inlet chamber 928 to the passage 929 and to the exhaust outlet chamber 930.

In the example of FIG. 9, the assembly 900 includes a port 927 and a cap 941 that covers the port 927. As shown, the port 927 opens to the exhaust inlet chamber 928 such that the wastegate valve plug 956 may be inserted therein. After insertion, the cap 941 may be installed to seal the port 927. As an example, the cap 941 may be removable, for example, for removal of the wastegate valve plug 956, which may be, for example, coupled to the stem 954.

In the example of FIG. 9, the assembly 900 provides for mounting control components onto the turbine housing 910, for example, rather than to a compressor housing. Such an approach may facilitate assembly, calibration, etc. when compared to an approach that mounts one or more control components to a compressor housing. For example, where a wastegate controller is mounted to a compressor housing, calibration of a control linkage may involve angular alignment of the compressor housing with respect to a center housing and with respect to a turbine housing. In contrast, where a wastegate controller is mounted to a turbine housing, such alignment concerns may be avoided.

Figure 10:
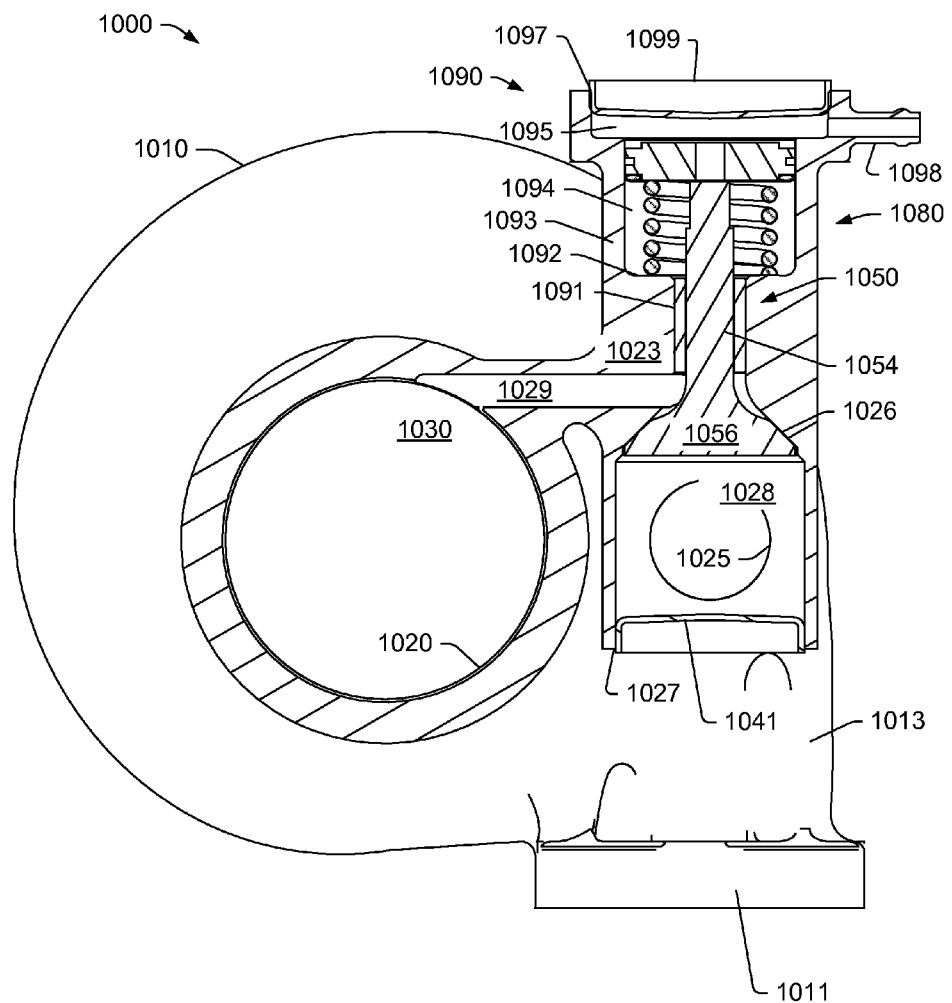
FIG. 10 shows a cutaway view of an example of an assembly that includes a wastegate valve seat disposed in an exhaust inlet chamber (e.g., a high pressure side of an exhaust bypass opening)

FIG. 10 shows a cutaway view of an example of an assembly 1000 that includes a wastegate valve seat 1026 disposed in an exhaust inlet chamber 1028 (e.g., a high pressure side of an exhaust bypass opening).

As shown in FIG. 10, the assembly 1000 includes a turbine housing 1010 that includes an exhaust inlet 1011, a shroud 1020 of a turbine wheel space, an exhaust outlet chamber 1030 and a wastegate valve sub-assembly 1050 that includes a wastegate valve plug 1056 and, for example, a stem 1054. In such an example, the stem 1054 and the wastegate valve plug 1056 may be a unitary component. As an example, the wastegate valve sub-assembly 1050 may be a poppet valve sub-assembly.

Figure 11:
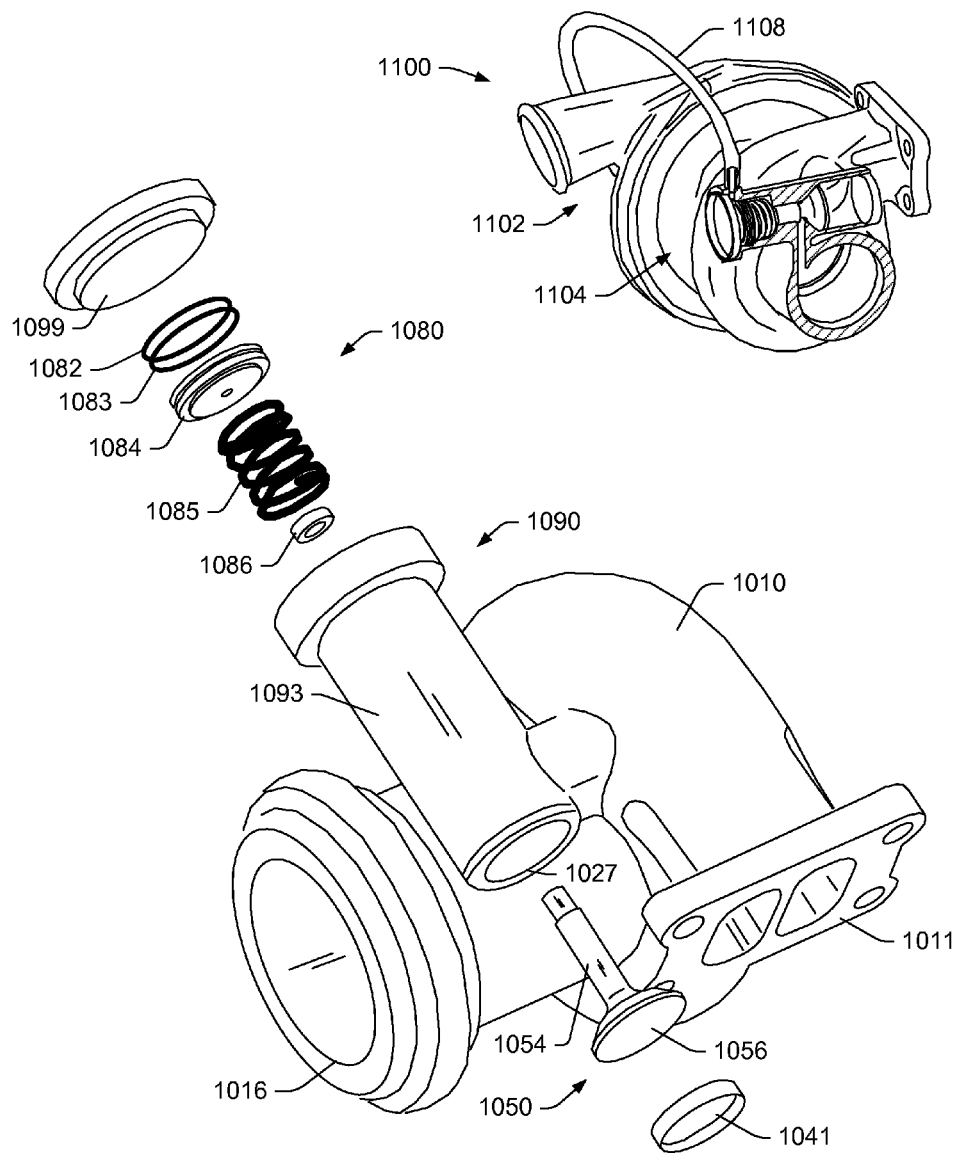
FIG. 11 shows an exploded, perspective view of the assembly of FIG. 10 and an example of a turbocharger that includes the assembly of FIG. 10.

Also shown in FIG. 10 is an actuator sub-assembly 1080 that includes various components, for example, as shown in and described with respect to an exploded view of FIG. 11. In the example of FIG. 10, the actuator sub-assembly 1080 may be received by a portion of turbine housing 1010 and be configured to operatively translate the stem 1054 and wastegate valve plug 1056, for example, to transition between a closed state and an open state of the wastegate valve plug 1056 with respect to the wastegate valve seat 1026.

In the example of FIG. 10, the turbine housing 1010 includes an actuator portion 1090 that includes a bore 1091, a seat 1092, a wall 1093 that defines a control chamber 1094, a pressurizable region 1095, a port 1097, a coupling 1098 and a cap 1099, for example, to seal the port 1097. As shown, various components of the actuator sub-assembly 1080 may be housed by the actuator portion 1090 of the turbine housing 1010. As an example, a cap may include a coupling, for example, where the cap may be fit (e.g., via threads, bayonet, etc.) to an opening (e.g., a port). In such an example, the coupling may include a shape such as the coupling 1098 and optionally extend axially away from the cap.

As shown in FIG. 10, the turbine housing 1010 includes an opening 1025 that provides for fluid communication between an inlet conduit 1013 and the exhaust inlet chamber 1028 while the wastegate valve seat 1026 defines an exhaust bypass opening between the exhaust inlet chamber 1028 and a passage 1029, which may be defined by a wall 1023 of the turbine housing 1010. As shown, the passage 1029 couples the exhaust inlet chamber 1028 and the exhaust outlet chamber 1030 where the position of the wastegate valve plug 1056 with respect to the wastegate valve seat 1026 determine whether exhaust may flow, for example, from the exhaust inlet chamber 1028 via the passage 1029 to the exhaust outlet chamber 1030.

During operation, as an example, exhaust may flow from the exhaust inlet 1011 via a volute (e.g., a scroll) to a nozzle that opens to a turbine wheel space defined in part by the shroud 1020. Where a turbine wheel is present in the turbine wheel space, the exhaust may cause rotation of the turbine wheel as it flow toward an exhaust outlet of the turbine housing 1010. Where a pressure P1 for exhaust in the exhaust inlet chamber 1028 exceeds a pressure P2 for exhaust in the exhaust outlet chamber 1030, the wastegate valve plug 1056 may be forced against the wastegate valve seat 1026, which may help to reduce undesirable leakage of exhaust (e.g., undesirable wastegating of exhaust).

In the example of FIG. 10, wastegating may be achieved by translating the wastegate valve plug 1056 axially away from the wastegate valve seat 1026, which moves the wastegate valve plug 1056 into the exhaust inlet chamber 1028 and opens the exhaust bypass opening defined by the wastegate valve seat 1026 such that exhaust may flow from the exhaust inlet chamber 1028 to the passage 1029 and to the exhaust outlet chamber 1030.

In the example of FIG. 10, the assembly 1000 includes a port 1027 and a cap 1041 that covers the port 1027. As shown, the port 1027 opens to the exhaust inlet chamber 1028 such that the wastegate valve plug 1056 may be inserted therein. After insertion, the cap 1041 may be installed to seal the port 1027. As an example, the cap 1041 may be removable, for example, for removal of the wastegate valve plug 1056, which may be, for example, coupled to the stem 1054.

In the example of FIG. 10, the assembly 1000 provides for mounting control components into the turbine housing 1010. Such an approach may facilitate assembly, calibration, etc. when compared to an approach that mounts one or more control components to a compressor housing. For example, where a wastegate controller is mounted to a compressor housing, calibration of a control linkage may involve angular alignment of the compressor housing with respect to a center housing and with respect to a turbine housing. In contrast, where a wastegate controller is mounted into a turbine housing, such alignment concerns may be avoided.

In the example of FIG. 10, the coupling 1098 may include a passage that is in fluid communication with the pressurizable region 1094, for example, pressurizable via a line coupled to the coupling 1098 (e.g., a fitting to couple a pressure line). As an example, pressure in the pressurizable region 1094 may act to translate the wastegate valve plug 1056.

As mentioned, FIG. 11 shows an exploded view of the assembly 1000 of FIG. 10, illustrating the exhaust inlet 1011 and an exhaust outlet 1016. In the exploded view, various components of the actuator sub-assembly 1080 are shown, including seal rings 1082 and 1083 that may fit to a disc 1084, a biasing component 1085 (e.g., a spring) and a collar 1086. As an example, the collar 1086 may be fitted to the stem 1054, for example, to reduce exhaust leakage of the stem 1054 with respect to the bore 1091. As an example, the biasing component 1085 may be seated between the disc 1084 and the seat 1092 where pressure in the pressurizable region 1095 causes the disc 1084 to translate the stem 1054 and the wastegate valve plug 1056. As an example, the biasing component 1085 may be a spring made of a material such as, for example, an alloy that includes austenitic nickel-chromium (e.g., a superalloy, etc.). As an example, the stem 1054 may include threads and the disc 1084 may include matching threads. In such an example, the threads may be used to adjust load, pre-tension, etc. on the biasing component 1085. As an example, the seal ring 1083 may provide a seal, for example, against exhaust contamination (see, e.g., FIG. 10). For example, the seal ring 1083 may be fit with respect to the disc 1084 to prevent intrusion of fluid (e.g., air) from a control side space and/or to prevent intrusion of exhaust to a control side space. As an example, the seal ring 1082 may be a piston ring. As an example, air in fluid communication with a compressor may be provided to a control side space (e.g., where variation in pressure of the air may cause actuation of a wastegate valve).

FIG. 11 also shows a perspective view of a turbocharger assembly 1100 that includes a compressor housing assembly 1102, a center housing assembly 1104 and the assembly 1000 along with a line 1108 that may provide pressure to the actuator sub-assembly 1080 of the assembly 1000. As an example, the line 1108 may be a pressure line coupled to a conduit, a chamber, etc. downstream of the compressor housing 1102. For example, where a charge pressure increases, the pressure may be communicated via the line 1108 and cause the actuator sub-assembly 1080 to translate the wastegate valve plug 1056 to an open state, which, in turn, may wastegate exhaust and act to reduce boost generated by the turbocharger assembly 1100.

As an example, a wastegate valve plug may be coupled to a stem, which may optionally be integral to the wastegate valve plug. As an example, the plug and stem may translate along an axis. As an example, a turbine housing may define an axis of a turbine wheel space, for example, that aligns with a rotational axis of a turbine wheel. As an example, an axis of a plug and stem may be substantially parallel to an axis of a turbine wheel space (see, e.g., the assembly 900). As an example, an axis of a plug and stem may be substantially orthogonal to an axis of a turbine wheel space (see, e.g., the assembly 600, the assembly 800, the assembly 1000). As an example, a mechanism for actuating a wastegate valve plug may optionally provide for rotation of the wastegate valve plug about a longitudinal axis (e.g., stem axis). In such an example, rotation of the wastegate valve plug may help to avoid sticking, for example, with respect to deposits (e.g., soot deposit, etc.). As an example, rotation may cause some friction between a wastegate valve plug and a seat, for example, in a manner that may act to remove deposits from the seat, the plug, etc.

An assembly for a turbocharger can include a turbine housing that defines an exhaust inflow chamber that includes a wastegate valve seat and that defines an exhaust outflow chamber; and a wastegate valve plug that includes a seal surface where, in a closed state, the seal surface seats against the wastegate valve seat and where, in an open state, the wastegate valve plug extends into the exhaust inflow chamber.

As an example, a wastegate valve stem may be coupled to a wastegate valve plug, for example, optionally as a unitary component. As an example, an assembly may include a wastegate valve arm coupled to a wastegate valve plug. In such an example, the wastegate valve arm and the wastegate valve plug may be a unitary component.

As an example, an assembly may include an access port configured for passage of a wastegate valve plug. As an example, an axis of a turbine wheel space defined by a turbine housing and a translational axis of a wastegate valve stem may be substantially parallel to each other. As an example, an axis of a turbine wheel space defined by a turbine housing and a translational axis of a wastegate valve stem may be substantially orthogonal to each other.

As an example, an assembly may include an exhaust inlet in fluid communication with an exhaust inlet chamber. As an example, an assembly may include an exhaust outlet in fluid communication with an exhaust outlet chamber. As an example, an assembly may include an exhaust wastegate passage that extends from an exhaust inlet chamber to an exhaust outlet chamber. In such an example, a wall of a turbine housing may define the exhaust wastegate passage.

As an example, a turbine housing may define a bore configured for receipt of a wastegate valve stem operatively coupled to a wastegate valve plug. As an example, a turbine housing may define a bore configured for receipt of a wastegate valve shaft operatively coupled to a wastegate valve plug.

As an example, an assembly may include a coupling for a pressure control line for controlling the state of a wastegate valve plug. As an example, a turbine housing may be provided with a coupling, for example, where an actuator sub-assembly is fits into a chamber or recess of the turbine housing.

As an example, a method can include providing a turbocharger that includes a turbine housing that defines an exhaust inflow chamber that includes a wastegate valve seat and that defines an exhaust outflow chamber, and a wastegate valve plug that includes a seal surface where, in a closed state, the seal surface seats against the wastegate valve seat and where, in an open state, the wastegate valve plug extends into the exhaust inflow chamber; and providing exhaust to the exhaust inflow chamber where a pressure of the exhaust in the exhaust inflow chamber applies force to the wastegate valve plug that acts to seat the seal surface against the wastegate valve seat.

As an example, a turbocharger can include a compressor housing; a center housing, the compressor housing operatively coupled to the center housing; a turbine housing operatively coupled to the center housing, where the turbine housing defines an exhaust inflow chamber that includes a wastegate valve seat and that defines an exhaust outflow chamber; and a wastegate valve plug that includes a seal surface where, in a closed state, the seal surface seats against the wastegate valve seat and where, in an open state, the wastegate valve plug extends into the exhaust inflow chamber. As an example, a turbocharger may include an actuator assembly mounted to a turbine housing. As an example, a turbocharger may include an actuator assembly mounted in a turbine housing. As an example, a turbocharger may include a pressure line coupled to a compressor housing and to a turbine housing for actuating a wastegate valve plug actuator.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A method comprising:
providing a turbocharger that comprises a turbine housing that defines an exhaust inflow chamber that comprises a wastegate valve seat and a wastegate valve plug access port and that defines an exhaust outflow chamber,
a cap that covers the wastegate valve plug access port, and
a wastegate valve plug that comprises a seal surface wherein, in a closed state, the seal surface seats against the wastegate valve seat and wherein, in an open state, the wastegate valve plug extends into the exhaust inflow chamber; and
providing exhaust to the exhaust inflow chamber wherein a pressure of the exhaust in the exhaust inflow chamber applies force to the wastegate valve plug that acts to seat the seal surface against the wastegate valve seat.

2. An assembly for a turbocharger comprising:
a turbine housing that defines an exhaust inflow chamber that comprises a wastegate valve seat and a wastegate valve plug access port and that defines an exhaust outflow chamber;
a cap that covers the wastegate valve plug access port; and
a wastegate valve plug that comprises a seal surface wherein, in a closed state, the seal surface seats against the wastegate valve seat and wherein, in an open state, the wastegate valve plug extends into the exhaust inflow chamber.

3. The assembly of claim 2 comprising a wastegate valve stem coupled to the wastegate valve plug.

4. The assembly of claim 3 wherein the wastegate valve stem and the wastegate valve plug comprise a unitary component.

5. The assembly of claim 3 wherein an axis of a turbine wheel space defined by the turbine housing and a translational axis of the wastegate valve stem are parallel to each other.

6. The assembly of claim 3 wherein an axis of a turbine wheel space defined by the turbine housing and a translational axis of the wastegate valve stem are orthogonal to each other.

7. The assembly of claim 3 comprising a coupling for a pressure control line for controlling the state of the wastegate valve plug.

8. The assembly of claim 2 wherein the wastegate valve plug access port comprises a perimeter dimension that exceeds a perimeter dimension of the wastegate valve plug for passage of the wastegate valve plug.

9. The assembly of claim 2 comprising an exhaust inlet in fluid communication with the exhaust inlet chamber.

10. The assembly of claim 2 comprising an exhaust outlet in fluid communication with the exhaust outlet chamber.

11. The assembly of claim 2 comprising an exhaust wastegate passage that extends from the exhaust inlet chamber to the exhaust outlet chamber.

12. The assembly of claim 11 wherein a wall of the turbine housing defines the exhaust wastegate passage.

13. The assembly of claim 2 wherein the turbine housing defines a bore configured for receipt of a wastegate valve stem operatively coupled to the wastegate valve plug.

14. The assembly of claim 2 wherein the wastegate valve plug access port defines a plane that is oriented parallel to a plane defined by the wastegate valve seat.

15. The assembly of claim 2 wherein the turbine housing defines an exhaust inlet opening that faces an exhaust inlet opening direction and a turbine wheel opening that faces a turbine wheel opening direction and wherein the wastegate valve plug access port faces the exhaust inlet opening direction or faces the turbine wheel opening direction.

16. The assembly of claim 2 wherein the cap comprises a removable cap wherein removal of the cap provides access to the wastegate valve plug.

17. A turbocharger comprising:
a compressor housing;
a center housing, the compressor housing operatively coupled to the center housing;
a turbine housing operatively coupled to the center housing, wherein the turbine housing defines an exhaust inflow chamber that comprises a wastegate valve seat and a wastegate valve plug access port and that defines an exhaust outflow chamber;
a cap that covers the wastegate valve plug access port; and
a wastegate valve plug that comprises a seal surface wherein, in a closed state, the seal surface seats against the wastegate valve seat and wherein, in an open state, the wastegate valve plug extends into the exhaust inflow chamber.

18. The turbocharger of claim 17 comprising an actuator assembly mounted to the turbine housing.

19. The turbocharger of claim 17 comprising an actuator assembly mounted in the turbine housing.

20. The turbocharger of claim 17 comprising a pressure line coupled to the compressor housing and to the turbine housing for actuating a wastegate valve plug actuator.

\* \* \* \* \*